(12) United States Patent
Wald et al.

(10) Patent No.: US 10,247,613 B1
(45) Date of Patent: Apr. 2, 2019

(54) OPTICAL HEAD TRACKING AND OBJECT TRACKING WITHOUT THE USE OF FIDUCIALS

(71) Applicants: Daniel S. Wald, Portland, OR (US); Marvin R. Lovato, West Linn, OR (US); David I. Han, Lake Oswego, OR (US); Brandon E. Wilson, Portland, OR (US)

(72) Inventors: Daniel S. Wald, Portland, OR (US); Marvin R. Lovato, West Linn, OR (US); David I. Han, Lake Oswego, OR (US); Brandon E. Wilson, Portland, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 1034 days.

(21) Appl. No.: 14/678,439

(22) Filed: Apr. 3, 2015

(51) Int. Cl.
*G01J 5/10* (2006.01)
*G01B 11/26* (2006.01)

(52) U.S. Cl.
CPC ............. *G01J 5/10* (2013.01); *G01B 11/26* (2013.01)

(58) Field of Classification Search
CPC .......... G01B 9/02044; G01B 9/02072; G01B 9/02042; G06F 3/013; G06F 3/0321; G03B 21/28; G02F 1/133553; H01S 5/18361

See application file for complete search history.

(56) References Cited

U.S. PATENT DOCUMENTS

| 7,045,996 B2* | 5/2006 | Lyon | G01D 21/00 324/207.11 |
|---|---|---|---|
| 2010/0103516 A1* | 4/2010 | McKnight | A63F 13/06 359/465 |
| 2016/0220324 A1* | 8/2016 | Tesar | G02B 21/0012 |

* cited by examiner

*Primary Examiner* — Elias Desta
(74) *Attorney, Agent, or Firm* — Donna P. Suchy; Daniel M. Barbieri

(57) ABSTRACT

A method of determining the angular orientation of headgear is described. The headgear has tracking points being at least four tracking points, the relative position of the tracking points is calibrated and stored as relative position information, each of the tracking points comprises an infra-red (IR) reflective point. Light reflected from at least some of the tracking points of the headgear is filtered to allow only light in an IR wavelength band to pass. The filtered IR light is imaged to provide a detected image including at least some of the tracking points. At least some of the tracking points in the detected image are identified, and the position of the identified tracking points in the detected image is determined. The angular orientation of the headgear is determined in multiple different angular directions based on the stored relative position information and the position of the identified tracking points.

20 Claims, 3 Drawing Sheets

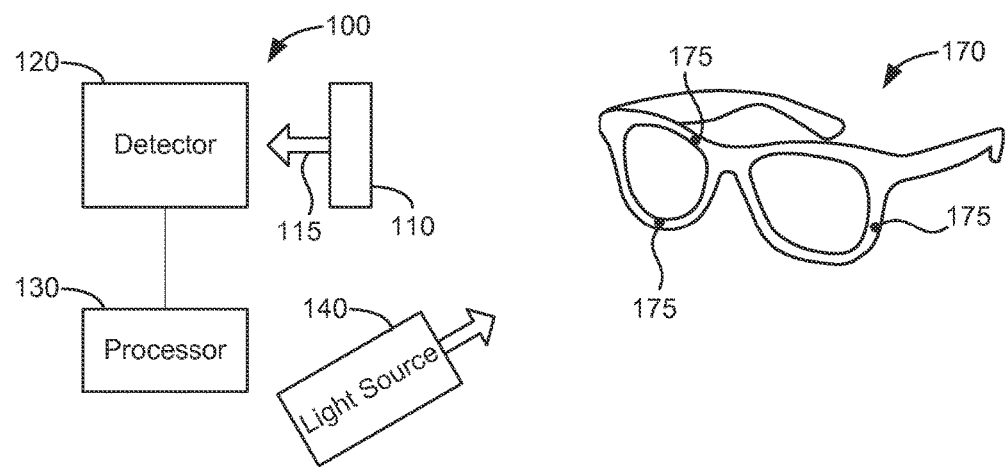
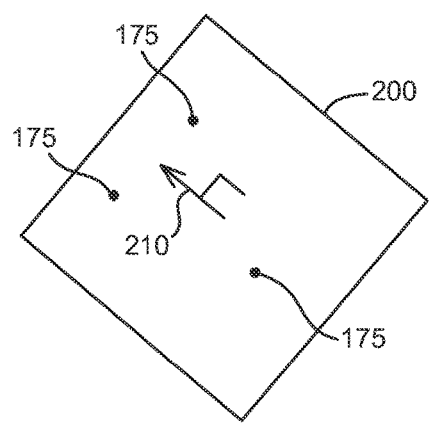
FIG. 2
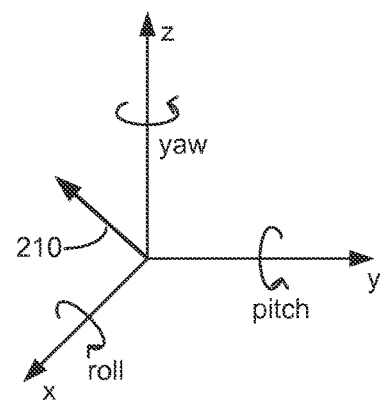
FIG. 3

OPTICAL HEAD TRACKING AND OBJECT TRACKING WITHOUT THE USE OF FIDUCIALS

BACKGROUND

The present invention relates generally to the field of a method and device for determining the angular orientation of headgear.

Tracking of the orientation of headgear, such as the headgear of an aircraft pilot, is known. Head tracking can be achieved through multiple means, most often in the form of magnetic tracking, ultrasonic tracking, inertial tracking, optical tracking and hybrid optical-inertial tracking.

Optical tracking can either be achieved through outside-in sensing (where a system of cameras is mounted external to the object being tracked with active/unique fiducials mounted on the object of interest), or inside-out sensing (where a camera is mounted on the object of interest and tracks active/unique fiducials of the external scene).

SUMMARY OF THE INVENTION

According to one embodiment of the invention there is provided a method of determining the angular orientation of headgear, the headgear having tracking points being at least four tracking points, the relative position of the tracking points being calibrated and stored as relative position information, each of the tracking points comprising an infra-red (IR) reflective point. The method comprising: filtering light reflected from at least some of the tracking points of the headgear to allow only light in an IR wavelength band to pass; imaging the filtered IR light to provide a detected image including at least some of the tracking points; identifying at least some of the tracking points in the detected image, and determining the position of the identified tracking points in the detected image; and determining the angular orientation of the headgear in multiple different angular directions based on the stored relative position information and the position of the identified tracking points.

According to one aspect of the embodiment, the determining the angular orientation of the head gear comprises: determining a reference plane corresponding to the tracking points based on the stored relative position information and the position of the identified tracking points.

According to another aspect of the embodiment, the determining the angular orientation of the head gear comprises: determining the angular orientation of the headgear in multiple different angular directions based on the stored relative position information, the position of the identified tracking points, and a calibrated initial angular orientation of the head gear.

According to another aspect of the embodiment, each IR reflective point comprises at least one of IR reflective tape or IR reflective paint.

According to another aspect of the embodiment, the filtering light reflected comprises filtering light reflected via an optical notch filter passing light only in the IR wavelength band.

According to another aspect of the embodiment, the imaging the filtered IR light is performed via at least one of a camera or a focal plane array.

According to another aspect of the embodiment, the headgear is at least one of glasses, a head worn display, a helmet mounted display, or an object requiring accurate three degrees of freedom or six degrees of freedom in real time.

According to another aspect of the embodiment, the method further comprises irradiating the headgear with IR light.

According to another aspect of the embodiment, the multiple different angular directions comprise yaw, pitch, and roll directions of the headgear.

According to another embodiment of the invention there is provided a method of calibrating an initial angular orientation of headgear, the headgear having tracking points being at least four tracking points, the relative position of the tracking points being calibrated and stored as relative position information, each of the tracking points comprising an infra-red (IR) reflective point. The method comprising: aligning the headgear in a laboratory environment; filtering light reflected from at least some of the tracking points of the headgear to allow only light in an IR wavelength band to pass; imaging the filtered IR light to provide a detected image including at least some of the tracking points; identifying at least some of the tracking points in the detected image, and determining the position of the identified tracking points in the detected image; determining the angular orientation of the headgear in multiple different angular directions based on the stored relative position information and the position of the identified tracking points; and setting the determined angular orientation of the headgear to be the initial angular orientation.

According to one aspect of the embodiment, the determining the angular orientation of the head gear comprises: determining a reference plane corresponding to the tracking points based on the stored relative position information and the position of the identified tracking points.

According to another embodiment of the invention there is provided a device for determining the angular orientation of headgear, the headgear having tracking points being at least four tracking points, the relative position of the tracking points being calibrated and stored as relative position information, each of the tracking points comprising an infra-red (IR) reflective point. The device comprising: a filter arranged to filter light reflected from at least some of the tracking points of the headgear to allow only light in an IR wavelength band to pass; a detector arranged to image the filtered IR light to provide a detected image including at least some of the tracking points; and a processor configured to identify at least some of the tracking points in the detected image, to determine the position of the identified tracking points in the detected image and to determine the angular orientation of the headgear in multiple different angular directions based on the stored relative position information and the position of the identified tracking points.

According to one aspect of the embodiment, the processor is configured to: determine a reference plane corresponding to the tracking points based on the stored relative position information and the position of the identified tracking points.

According to another aspect of the embodiment, the processor is configured to: determine the angular orientation of the headgear in multiple different angular directions based on the stored relative position information, the position of the identified tracking points, and a calibrated initial angular orientation of the head gear.

According to another aspect of the embodiment, each IR reflective point comprises at least one of IR reflective tape or IR reflective paint.

According to another aspect of the embodiment, the filter comprises an optical notch filter.

According to another aspect of the embodiment, the imaging the filtered IR light is performed via at least one of a camera or a focal plane array.

According to another aspect of the embodiment, the headgear is at least one of glasses, a head worn display, a helmet mounted display, or an object requiring accurate three degrees of freedom or six degrees of freedom in real time.

According to another aspect of the embodiment, the device further comprises an IR light source configured to irradiate the headgear with IR light.

According to another aspect of the embodiment, the multiple different angular directions comprise yaw, pitch, and roll directions of the headgear.

BRIEF DESCRIPTION OF THE DRAWINGS

FIG. 1 is a schematic of a device for determining the angular orientation of headgear, according to an embodiment of the invention.

FIG. 2 illustrates tracking points, a reference plane, and normal vector normal to the reference plane.

FIG. 3 illustrates the normal vector in xyz coordinate system also showing yaw, pitch and roll angular rotations.

DETAILED DESCRIPTION

Figure 4:
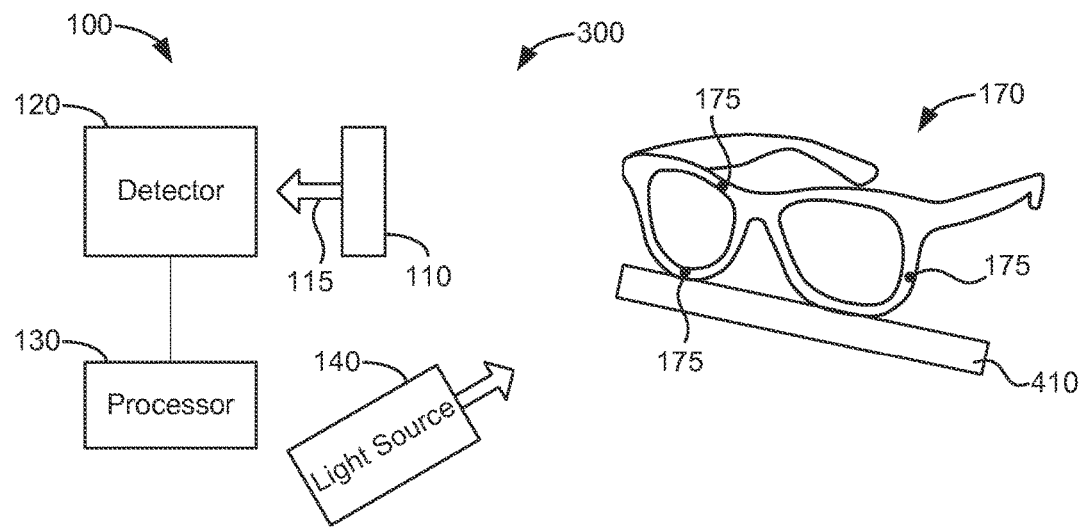
FIG. 4 is a schematic of an alignment device for calibrating the headgear, according to an embodiment of the invention.

According to certain described embodiments, the system includes an optical filter which allows only light within an IR wavelength band to pass to the detector, and the headgear has tracking points which reflect light with an IR wavelength within the wavelength band.

The combination of tracking points with IR reflection points, and allowing only IR light within a wavelength band to pass and be detected, reduces the clutter of the scene in the vicinity of the tracking points, particularly in the case where the clutter does not reflect IR light within a wavelength band. The clutter is reduced because only the IR reflecting tracking points are "seen" by the detector and not the background clutter.

Tracking may be achieved using only a single detector, such as a camera, and/or an FPA. Thus the complexity of the system may be reduced.

Since the tracking is performed using tracking points which reflect IR light, active fiducials or passive fiducials need not be used. Fiducials, active or passive, are unique and identifiable, such as bar codes. Foregoing fiducials reduces size, weight, power, and cost associated with tracking systems which use active fiducials mounted to track headgear. Since passive fiducials are not used, the need to properly mount a large bar-code style passive fiducial required for currently employed passive tracking algorithms is eliminated. Further, since there is no need for unique fiducials, a smaller form factor and easier sensor recognition can be achieved.

Further, according to certain embodiments, the system is used with stored relative position information (form factor), which provides the relative position of the tracking points on the headgear. Thus, the system is adaptable to any form factor attributed to a particular headgear. This eliminates variability in the field and simplifies user inputs. Moreover, placement of the IR reflecting tracking points is not tightly constrained due to the use of calibrated positional information, allowing for a more manufacturable product than that using fixed fiducials typically required for outside-in tracking systems.

FIG. 1 illustrates a device 100 for determining the angular orientation of headgear 170. The device 100 includes an optical filter 110, a detector 120, a processor 130, and optionally a light source 140.

The device 100 determines the angular orientation of headgear 170 based on infra-red (IR) light reflected by tracking points 175 on the head gear 170. FIG. 1 illustrates three tracking points 175 for ease of illustration, but in general the number of tracking points 175 may be four or more. Each of tracking points 175 may comprise an IR reflective point, which reflects IR light. The IR reflective points may be, for example, IR reflective tape and/or IR reflective paint. The relative position of the tracking points 175 is calibrated, such in a laboratory environment, and is stored as relative position information (form factor). The processor 130 has access to the stored relative position information, such as via a memory (not shown) internal or external to the processor 130.

The filter 110 is arranged to filter light reflected from at least some of the tracking points 175 of the headgear to allow only light in an IR wavelength band to pass. The filter 110 may be an optical notch filter, for example. The combination of tracking points with IR reflection points, and allowing only IR light in a wavelength band to pass, reduces the clutter of the scene in the vicinity of the tracking points, particularly in the case where the clutter does not reflect IR light within a wavelength band. This concept is similar to a "blue screen" where the blue is filtered out or not detected, such that only a non-blue object in front of the blue screen is imaged.

The detector 120 is arranged to image the filtered IR light 115 to provide a detected image including at least some of the tracking points 175. The detected image need not include all of the tracking points 175, and will not in the case that the headgear 170 is oriented that some of the tracking points are blocked from being imaged due to the orientation of the headgear 170. That is, a tracking point 175 will not be in the detected image in the case that the detector 120 can not "see" that tracking point due to a portion of the head gear 170, or some other object, blocking the sight line from the tracking point to the detector 120.

While FIG. 1 illustrates the tracking points 175 only on a front of the headgear 170, in general the tracking points 175 may be include tracking points other than on the front, such as on the sides of the headgear 170. This facilitates tracking in the case that the headgear is rotated to the extent that a side of the headgear with a tracking point becomes visible to the detector 120, and thus the tracking point on the side may be tracked.

The detector 120 may be a camera and/or a focal plane array (FPA). For example, the detector 120 may be a camera with an FPA, where the FPA includes an array of pixels. The detector 120 may including imaging optics, such as would be present with a camera.

The processor 130 may be configured to identify at least some of the tracking points 175 in the detected image and determine the position of identified tracking points 175 in the image. The identification of tracking points 175 is aided because the background clutter near the tracking points is reduced or eliminated through the use filtering out the background clutter via the filter 110, thus leaving only the tracking pints 175 in the image.

The processor 130 may further be configured to determine the angular orientation of the headgear 170 in multiple different angular directions based on stored relative position information and the position of the identified tracking points. The processor 130 may have a memory storing a program for determining angular orientation, or include a circuit providing the structure to determine the angular orientation.

The device 100 may optionally include a light source 140. A light source 140 is not required since generally the ambient light illuminating the head gear will be sufficient to reflect off of the tracking points 175, and the reflection detected by the detector 120 to provide an image. The light source 140 may be a light emitting diode (LED) or laser with a beam expander, for example, emitting light within the wavelength pass band of the filter 110.

The processor 130 may be configured to determine a reference plane corresponding to the tracking points 175 based on the stored relative position information and the detected image, and to calculate a normal vector normal to the reference plane.

The headgear 170 may be glasses, a head worn display (HWD), a helmet mounted display (HMD), or an object requiring accurate three degrees of freedom or six degrees of freedom in real time for example. The headgear 170 may include an inertial motion unit (IMU) which determines motion of the headgear 170.

FIG. 2 illustrates three tracking points 175 and a reference plane 200 corresponding to the tracking points 175. FIG. 2 illustrates three tracking points 175 for ease of illustration, but in general the number of tracking points 175 may be four or more. While the reference plane 200 corresponds to the tracking points 175, one or more of the tracking points 175 need not be in the reference plane 200. The relative position of the reference plane 200, however, is fixed relative to the tracking points 175. Thus, when the tracking points 175, which have a fixed position relative to each other, rotate, the reference plane 200 may also rotate with the tracking points 175 so as to maintain the fixed relationship with respect to the tracking points 175.

FIG. 2 further illustrates a normal vector 210, which is normal relative to the reference plane 200. Once the reference plane 200 is determined, its normal vector 210 may be readily determined. The three dimensional rotation of the tracking points 175 may be expressed in terms of the normal vector 210, which is perpendicular to the reference plane 200, and the rotation of the tracking points 175 around an axis along the normal vector 210.

FIG. 3 illustrates the normal vector 210 in an (x,y,z,Y,P,R) coordinate system. FIG. 3 discloses the three angular rotations of yaw, pitch and roll (YPR), where yaw is the counterclockwise rotation about the z axis, pitch is the counterclockwise rotation about the y axis, and roll is the counterclockwise rotation about the x axis. The three dimensional rotation of the tracking points 175 may be expressed in terms of YPR angular coordinates, for example. Angular coordinate systems other than YPR angular coordinates may also be used.

As mentioned above, the relative position of the tracking points 175 is calibrated and is stored as relative position information. Thus a form factor (relative position information) for the tracking points 175 is determined. Measuring the form factor may be performed in a laboratory environment in an initial calibration. The relative position information is stored, such as in a memory, for later use in determining the relative angular orientation of the headgear 170, based on tracking the tracking points 175. Calibration may performed by knowing the true positions of the tracking point 175 as measured in a calibrated laboratory environment.

FIG. 4 illustrates an alignment device 300 for initially calibrating the headgear 170 and determining the relative position information, and for a process which includes physically aligning the headgear 170. The device 300 of FIG. 4 is similar to the device 100 of FIG. 1, but further includes aligning equipment 410 upon which the headgear 170 may be mounted where the aligning equipment 410 allows the headgear to be rotated to true positions. The distance from the detector 120 to the aligning equipment 410 is known in the calibrated setting.

The headgear 170 is angularly and possibly translationally moved to bring the tracking points 175 into true positions. The angular orientation of the headgear 170 when the tracking points 175 are in true positions is considered to be an initial angular orientation. The relative distances between the tracking points is determined based on the known distances from the detector 120 to aligning equipment 410, and based on the imaged tracking points 175.

Once the headgear 170 is physically oriented to the initial angular orientation, operation of the device 100 is performed in a similar fashion to that described with respect to FIG. 1. That is, light from the tracking points 175 is filtered to allow only light in an IR wavelength band to pass, the filtered IR light is imaged to provide a detected image including at least some of the tracking points 175, and at least some of the tracking points 175 in the detected image are identified. The relative position information (form factor) is determined based on the known distance from the detector 120 to the aligning equipment 410, and the position of the tracking points 175 on the detected image.

Figure 5:
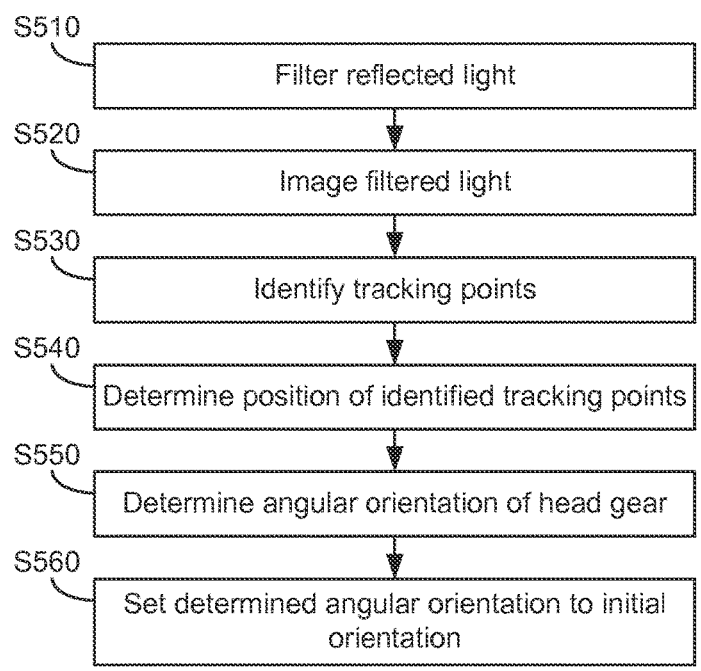
FIG. 5 is a flow chart illustrating a process of determining an initial angular orientation of the headgear.

FIG. 5 is a flow chart illustrating steps in a process of determining the initial angular orientation of the headgear 170 after the stored relative position information (form factor) of the headgear has been determined. This process may be performed in a headgear use environment, where a user has donned the headgear 170, and where the detector 120 position has been calibrated. In step S510, the reflected light from at least some of the tracking points 175 are filtered by the filter 110. In particular, light reflected from at least some of the tracking points 175 is filtered to allow only light in an IR wavelength band to pass.

In step S520, filtered IR light is imaged to provide a detected image including at least some of the tracking points 175. The imaging is performed using the detector 120.

In step S530, the tracking points 174 in the detected image are identified.

In step S540, the position of the identified tracking points in the detected image is determined.

In step S550, the processor 130 determines the angular orientation of the headgear 170 in multiple different angular directions based on the stored relative position information and the position of the identified tracking points 175. The angular orientation may be expressed in a YPR coordinate system, or any other appropriate coordinate system. In particular, the reference plane corresponding to the tracking points 175 may be determined based on the stored relative position information and the position of the identified tracking points 175. Once the reference plane is determined, a normal vector normal to the reference plane may be readily determined. Further the rotation of the tracking points 175 about an axis along the normal vector may further be determined.

In step S560 the determined angular orientation of the headgear 170, as determined in step S550, is set to be the initial angular orientation of the headgear 170.

Figure 6:
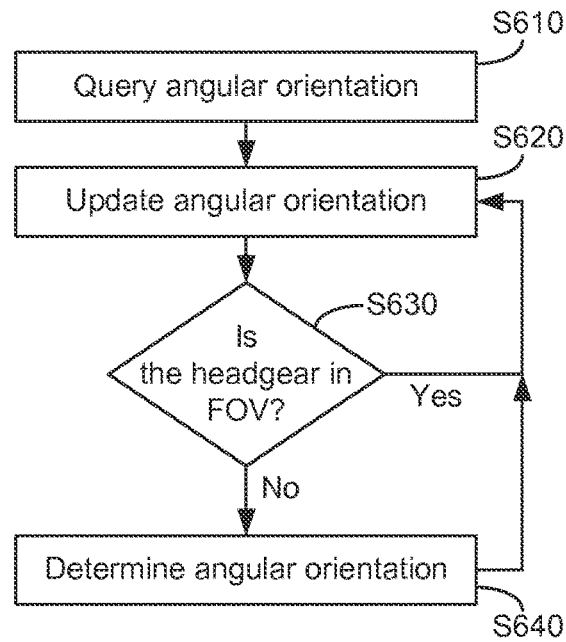
FIG. 6 is a flow chart illustrating a process of continuously determining the angular orientation of the headgear in operation.

FIG. 6 is a flow chart illustrating steps in a process of continuously determining the angular orientation of the headgear 170 in operation. In step S610, the headgear 170 queries its angular orientation to the device 100. In step S620, the angular orientation of the headgear 170 is updated. If no angular orientation of the headgear 170 is stored, the angular orientation of the headgear 170 is set to the initial angular orientation of the headgear 170.

In step S630, it is determined if the headgear 170 is in the field of view (FOV) of the detector 120. In particular, if tracking points 175 may be identified, then it is determined that the headgear 170 is in the FOV. If the headgear 170 is determined to not be in the FOV, the process returns to step S620. If the headgear 170 is determined to be in the FOV, the process proceeds to step S640 where the process of determining the angular orientation of the headgear 170 is performed. Once the process of determining the angular orientation of the headgear 170 is performed in step S640, the process proceeds to step S620, where the angular orientation of the headgear 170 is updated. The rate at which the angular orientation of the headgear 170 is updated based on the determining the angular orientation of the headgear 170 in step S640, may be at about a 30 Hz rate, for example.

Figure 7:
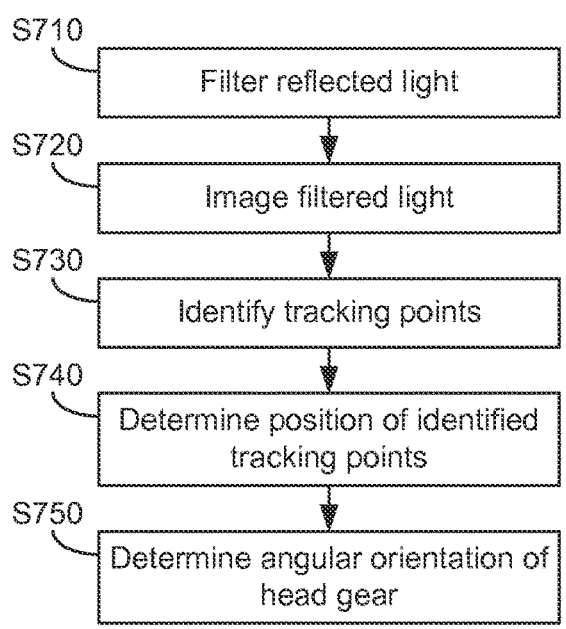
FIG. 7 is a flow chart illustrating a process of determining the angular orientation of the headgear of a step in the process of FIG. 6.

FIG. 7 is a flow chart illustrating steps in a process of determining the angular orientation of the headgear 170 of step S640 of FIG. 6. In step S710, the reflected light from at least some of the tracking points 175 are filtered by the filter 110. In particular, light reflected from at least some of the tracking points 175 is filtered to allow only light in an IR wavelength band to pass.

In step S720, filtered IR light is imaged to provide a detected image including at least some of the tracking points 175. The imaging is performed using the detector 120.

In step S730, the tracking points 175 in the detected image are identified.

In step S740, the position of the identified tracking points in the detected image is determined.

In step S750, the processor 130 determines the angular orientation of the headgear 170 in multiple different angular directions based on the stored relative position information and the position of the identified tracking points 175. Further, the angular orientation of the headgear 170 in multiple different angular directions may be determined based on the initial angular orientation from step S560 of the process of FIG. 5, in addition to the stored relative position information and the position of the identified tracking points 175. In this case, in step S750, the angular orientation of the headgear 170 may be determined relative to the initial angular orientation.

The angular orientation may be expressed in a YPR coordinate system, or any other appropriate coordinate system. In particular, the reference plane corresponding to the tracking points 175 may be determined based on the stored relative position information and the position of the identified tracking points 175. Once the reference plane is determined, a normal vector normal to the reference plane may be readily determined. Further the rotation of the tracking points 175 about an axis along the normal vector may further be determined.

As mentioned above, according to certain described embodiments, the system includes an optical filter which allows only light within an IR wavelength band to pass to the detector, and the headgear has tracking points which reflect light with an IR wavelength within the wavelength band.

The combination of tracking points with IR reflection points, and allowing only IR light within a wavelength band to pass and be detected, reduces the clutter of the scene in the vicinity of the tracking points, particularly in the case where the clutter does not reflect IR light within a wavelength band. The clutter is reduced because only the IR reflecting tracking points are "seen" by the detector and not the background clutter.

Tracking may be achieved using only a single detector, such as a camera, and/or an FPA. Thus the complexity of the system may be reduced.

Since the tracking is performed using tracking points which reflect IR light, active fiducials or passive fiducials need not be used. Fiducials, active or passive, are unique and identifiable, such as bar codes. Foregoing fiducials reduces size, weight, power, and cost associated with tracking systems which use active fiducials mounted to track headgear. Since passive fiducials are not used, the need to properly mount a large bar-code style passive fiducial required for currently employed passive tracking algorithms is eliminated. Further, since there is no need for unique fiducials, a smaller form factor and easier sensor recognition can be achieved.

Further, according to certain embodiments, the system is used with stored relative position information (form factor), which provides the relative position of the tracking points on the headgear. Thus, the system is adaptable to any form factor attributed to a particular headgear. This eliminates variability in the field and simplifies user inputs. Moreover, placement of the IR reflecting tracking points is not tightly constrained due to the use of calibrated positional information, allowing for a more manufacturable product than that using fixed fiducials typically required for outside-in tracking systems.

The embodiments of the invention have been described in detail with particular reference to preferred embodiments thereof, but it will be understood by those skilled in the art that variations and modifications can be effected within the spirit and scope of the invention.

What is claimed is:

1. A method of determining the angular orientation of headgear, the headgear having tracking points being at least four tracking points, the relative position of the tracking points being calibrated and stored as relative position information, each of the tracking points comprising an infra-red (IR) reflective point, the method comprising:

filtering light reflected from at least some of the at least four tracking points of the headgear to allow only light in an IR wavelength band to pass;

processing the filtered IR light to provide a detected image including at least some of the at least four tracking points;

identifying at least some of the at least four tracking points in the detected image, and determining the position of the identified tracking points in the detected image; and determining the angular orientation of the headgear in multiple different angular directions based on the stored relative position information and the position of the identified tracking points.

2. The method of claim 1, wherein the determining the angular orientation of the head gear comprises:
determining a reference plane corresponding to the identified tracking points based on the stored relative position information and the position of the identified tracking points.

3. The method of claim 1, wherein the determining the angular orientation of the head gear comprises: determining the angular orientation of the headgear in multiple different angular directions based on the stored relative position information, the position of the identified tracking points, and a calibrated initial angular orientation of the head gear.

4. The method of claim 1, wherein each IR reflective point comprises at least one of IR reflective tape or IR reflective paint.

5. The method of claim 1, wherein the filtering light reflected comprises filtering light reflected via an optical notch filter passing light only in the IR wavelength band.

6. The method of claim 1, wherein the processing the filtered IR light is performed via at least one of a camera or a focal plane array.

7. The method of claim 1, wherein the headgear is at least one of glasses, a head worn display, a helmet mounted display, or an object requiring accurate three degrees of freedom or six degrees of freedom in real time.

8. The method of claim 1, further comprising irradiating the headgear with IR light.

9. The method of claim 1, wherein the multiple different angular directions comprise yaw, pitch, and roll directions of the headgear.

10. A method of calibrating an initial angular orientation of headgear, the headgear having tracking points being at least four tracking points, the relative position of the tracking points being calibrated and stored as relative position information, each of the tracking points comprising an infra-red (IR) reflective point, the method comprising:
aligning the headgear in a laboratory environment;
filtering light reflected from at least some of the at least four tracking points of the headgear to allow only light in an IR wavelength band to pass;
imaging processing the filtered IR light to provide a detected image including at least some of the at least four tracking points;
identifying at least some of the at least four tracking points in the detected image, and determining the position of the identified tracking points in the detected image;
determining the angular orientation of the headgear in multiple different angular directions based on the stored relative position information and the position of the identified tracking points; and
setting the determined angular orientation of the headgear to be the initial angular orientation.

11. The method of claim 10, wherein the determining the angular orientation of the head gear comprises:
determining a reference plane corresponding to the identified tracking points based on the stored relative position information and the position of the identified tracking points.

12. A device for determining the angular orientation of headgear, the headgear having tracking points being at least four tracking points, the relative position of the tracking points being calibrated and stored as relative position information, each of the tracking points comprising an infra-red (IR) reflective point, the device comprising:
a filter arranged to filter light reflected from at least some of the at least four tracking points of the headgear to allow only light in an IR wavelength band to pass;
a detector arranged to process the filtered IR light to provide a detected image including at least some of the at least four tracking points; and
a processor configured to identify at least some of the at least four tracking points in the detected image, to determine the position of the identified tracking points in the detected image and to determine the angular orientation of the headgear in multiple different angular directions based on the stored relative position information and the position of the identified tracking points.

13. The device of claim 12, wherein the processor is configured to:
determine a reference plane corresponding to the identified tracking points based on the stored relative position information and the position of the identified tracking points.

14. The device of claim 12, wherein the processor is configured to:
determine the angular orientation of the headgear in multiple different angular directions based on the stored relative position information, the position of the identified tracking points, and a calibrated initial angular orientation of the head gear.

15. The device of claim 12, wherein each IR reflective point comprises at least one of IR reflective tape or IR reflective paint.

16. The device of claim 12, wherein the filter comprises an optical notch filter.

17. The device of claim 12, wherein the processing the filtered IR light is performed via at least one of a camera or a focal plane array.

18. The device of claim 12, wherein the headgear is at least one of glasses, a head worn display, or a helmet mounted display, or an object requiring accurate three degrees of freedom or six degrees of freedom in real time.

19. The device of claim 12, further comprising an IR light source configured to irradiate the headgear with IR light.

20. The device of claim 12, wherein the multiple different angular directions comprise yaw, pitch, and roll directions of the headgear.

* * * * *